(12) United States Patent
Mori et al.

(10) Patent No.: US 12,117,009 B2
(45) Date of Patent: Oct. 15, 2024

(54) VACUUM PUMP INCLUDING MAGNETIC BEARING AND MOTOR BEARING OPERABLE AS RADIAL MAGNETIC BEARING, MOTOR, AND THRUST MAGNETIC BEARING

(71) Applicant: Shimadzu Corporation, Kyoto (JP)

(72) Inventors: Takahiro Mori, Kyoto (JP); Tsunehiro Inoue, Kyoto (JP); Tomoo Ota, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 106 days.

(21) Appl. No.: 17/604,230

(22) PCT Filed: Apr. 25, 2019

(86) PCT No.: PCT/JP2019/017724
§ 371 (c)(1),
(2) Date: Oct. 15, 2021

(87) PCT Pub. No.: WO2020/217407
PCT Pub. Date: Oct. 29, 2020

(65) Prior Publication Data
US 2022/0205449 A1  Jun. 30, 2022

(51) Int. Cl.
*F04D 19/04* (2006.01)
*F16C 32/04* (2006.01)

(52) U.S. Cl.
CPC ......... *F04D 19/042* (2013.01); *F04D 19/048* (2013.01); *F16C 32/0489* (2013.01); *F16C 32/0497* (2013.01); *F16C 2360/45* (2013.01)

(58) Field of Classification Search
None
See application file for complete search history.

(56) References Cited

U.S. PATENT DOCUMENTS 5,059,092 A * 10/1991 Kabelitz ............... F16C 39/02
417/423.4
5,355,042 A * 10/1994 Lewis ............... F16C 32/0444
310/68 B (Continued)

FOREIGN PATENT DOCUMENTS

CN  101207309 A  6/2008
CN  103104512 A  5/2013

(Continued)

OTHER PUBLICATIONS

Machine translation of DE 10338167 (Obtained from USPTO Search Copyright 2023 Clarivate Analytics) (Year: 2023).*

(Continued)

*Primary Examiner* — Essama Omgba
*Assistant Examiner* — Geoffrey S Lee
(74) *Attorney, Agent, or Firm* — Muir Patent Law, PLLC (57) ABSTRACT

A rotation mechanism (20) of a vacuum pump (100) includes a magnetic bearing unit (21) having a first outer diameter (91), the magnetic bearing unit (21) being operable as a first radial magnetic bearing (40), and a motor unit (22) provided on a side of a second end (11b) of a rotary shaft (11) relative to the magnetic bearing unit, the motor unit (22) having a second outer diameter (92) larger than the first outer diameter, the motor unit (22) being operable as both a motor (30) and a second radial magnetic bearing (50).

9 Claims, 6 Drawing Sheets

(56) References Cited

U.S. PATENT DOCUMENTS

| | | | |
|---|---|---|---|
| 5,936,370 A * | 8/1999 | Fukao | F16C 32/0448 318/560 |
| 6,278,251 B1 | 8/2001 | Schöb | |
| 6,351,048 B1 * | 2/2002 | Schob | F16C 32/0459 310/68 B |
| 6,422,837 B1 | 7/2002 | Komoriya | |
| 2002/0155013 A1 * | 10/2002 | Komoriya | F04D 19/048 417/423.4 |
| 2003/0007862 A1 * | 1/2003 | Ohtachi | F04D 29/701 415/121.2 |
| 2010/0033046 A1 * | 2/2010 | Chiba | F16C 32/0459 310/90.5 |
| 2010/0231076 A1 | 9/2010 | Chiba et al. | |
| 2012/0169167 A1 * | 7/2012 | Fan | H02K 7/09 310/90.5 |
| 2013/0115074 A1 * | 5/2013 | Tsutsui | F04D 29/601 415/213.1 |
| 2016/0252099 A1 * | 9/2016 | Kawashima | H02K 7/14 310/90.5 |
| 2017/0040868 A1 * | 2/2017 | Noh | H02K 21/44 |

FOREIGN PATENT DOCUMENTS

| | | | |
|---|---|---|---|
| CN | 106594072 A | 4/2017 | |
| CN | 111102234 B * | 9/2021 | F04D 29/058 |
| DE | 10062753 A1 * | 10/2001 | F16C 32/0465 |
| DE | 10338167 A1 * | 4/2005 | F04D 19/048 |
| EP | 0989656 A1 | 3/2000 | |
| JP | S58-79695 U | 5/1983 | |
| JP | 2000283160 A | 10/2000 | |
| JP | 4616405 B2 | 1/2011 | |
| JP | 5892628 B2 | 3/2016 | |

OTHER PUBLICATIONS

Machine translation of DE 10062753 (Obtained from USPTO Search Copyright 2023 Clarivate Analytics) (Year: 2023).*

Machine Translation of CN111102234 (Obtained from USPTO Search) (Year: 2024).*

First Office Action dated Jan. 4, 2023 for corresponding Chinese Patent Application No. 201980093718.0.

Second Office Action dated Jun. 15, 2023 issued in relation to the corresponding Chinese Patent Application No. 201980093718.0 together with an machine English translation thereof.

International Search Report dated Jul. 23, 2019 issued for International application No. PCT/JP2019/017724.

Matsuzaki et al. "Novel Structure of Three-Axis Active-Control-Type Magnetic Bearing for Reducing Rotor Iron Loss" IEEE Trans. On magnetics vol. 52 No. 7 Jul. 2016.

Third Office Action dated Sep. 21, 2023 issued in relation to the corresponding Chinese Patent Application No. 201980093718.0 together with a machine English translation thereof.

* cited by examiner

FIG.8
(MODIFIED EXAMPLE)

VACUUM PUMP INCLUDING MAGNETIC BEARING AND MOTOR BEARING OPERABLE AS RADIAL MAGNETIC BEARING, MOTOR, AND THRUST MAGNETIC BEARING

TECHNICAL FIELD

The present invention relates to a vacuum pump, and more particularly, it relates to a vacuum pump including a magnetic bearing and a motor.

BACKGROUND ART

Conventionally, a vacuum pump including a magnetic bearing and a motor is known. Such a vacuum pump is disclosed in Japanese Patent Laid-Open No. 2000-283160, for example.

Japanese Patent Laid-Open No. 2000-283160 discloses a turbomolecular pump (vacuum pump) including a rotor blade, a high frequency motor that rotates the rotor blade, and a 5-axes-control type magnetic bearing. In the 5-axes-control type magnetic bearing, two sets of radial position controlling electromagnets and one set of axial position controlling electromagnets are used.

Although not explicitly described in Japanese Patent Laid-Open No. 2000-283160, the drawings of Japanese Patent Laid-Open No. 2000-283160 show a configuration in which the rotor blade is provided at the tip end of a rotary shaft extending in an upward-downward direction, and a first set of radial position controlling electromagnets, the high frequency motor, a second set of radial position controlling electromagnets, and the axial position controlling electromagnets are provided side by side in order from the rotor blade side along the axial direction of a rotation axis.

PRIOR ART

Patent Document

Patent Document 1: Japanese Patent Laid-Open No. 2000-283160

SUMMARY OF THE INVENTION

Problem to be Solved by the Invention

As described in Japanese Patent Laid-Open No. 2000-283160, in a conventional vacuum pump, in addition to a motor to rotate a rotary body including a rotor blade and a rotary shaft, two sets of radial position controlling electromagnets (radial magnetic bearings) and one set of axial position controlling electromagnets (thrust magnetic bearings) are provided to magnetically levitate the rotary body, and these four mechanisms (a motor, two sets of radial magnetic bearings, and one set of thrust magnetic bearings) are arranged side by side along the axial direction.

In order to enable the vacuum pump to be installed in a smaller space, it is desired to reduce the dimension of the vacuum pump in the axial direction. In the conventional vacuum pump, the dimension of the vacuum pump in the axial direction have not been sufficiently studied.

The present invention is intended to solve the above problem. The present invention aims to provide a vacuum pump capable of reducing the dimension thereof in the axial direction.

Means for Solving the Problem

In order to attain the aforementioned object, a vacuum pump according to an aspect of the present invention includes a rotary body including a rotary shaft, the rotary shaft having a first end and a second end, the rotary shaft extending in an axial direction thereof, a blade support connected to the first end of the rotary shaft, the blade support having a shape extending such that an inner diameter thereof increases from the first end side toward the second end side in the axial direction of the rotary shaft, and a rotor blade provided on an outer peripheral surface of the blade support, and a rotation mechanism including a motor configured to rotationally drive the rotary body, first and second radial magnetic bearings each configured to support the rotary body in a radial direction of the rotary shaft, and a thrust bearing configured to support the rotary body in the axial direction. The rotation mechanism includes a magnetic bearing unit provided around the rotary shaft between the rotary shaft and the blade support, the magnetic bearing unit having a first outer diameter, the magnetic bearing unit being operable as the first radial magnetic bearing, and a motor unit provided around the rotary shaft on the second end side of the rotary shaft relative to the magnetic bearing unit, the motor unit having a second outer diameter larger than the first outer diameter, the motor unit being operable as both the motor and the second radial magnetic bearing.

In this description, the term "unit" refers to a group of mechanical structures for performing a certain function. The term "motor unit being operable as both the motor and the second radial magnetic bearing" refers to a unit provided such that at least some are shared between components of the motor and components of the second radial magnetic bearing. The expression "an inner diameter thereof increases from the first end side toward the second end side in the axial direction of the rotary shaft" indicates a broader concept including not only a shape with a continuously increasing inner diameter, but also a shape with a gradually increasing inner diameter. The term "magnetic bearing" refers to a bearing that magnetically supports the rotary shaft in a non-contact manner during steady operation. Non-contact support allows contact at the time of stopping the magnetic bearing and in an unsteady state associated with the start and stop of operation.

Effect of the Invention

According to the present invention, as described above, the motor unit that is operable as both the motor and the second radial magnetic bearing is provided such that the motor and the second radial magnetic bearing are integrated into a single unit, and thus as compared with a case in which the motor and the second radial magnetic bearing are arranged separately in the axial direction, the dimension of a region occupied by the unit in the axial direction can be reduced. Furthermore, in the motor unit with the motor and the second radial magnetic bearing integrated into a single unit, as compared with a unit including only the motor, for example, the dimension in the axial direction or the dimension in the radial direction tends to increase. In the present invention, the motor unit has the second outer diameter larger than the first outer diameter of the magnetic bearing unit, and thus although the dimension in the radial direction increases, an increase in the dimension of the motor unit in the axial direction can be significantly reduced or prevented. Furthermore, focusing on the rotary body, in a structure including the rotor blade on the first end side of the rotary shaft, an installation space for the motor and the bearing that can be ensured around the rotary shaft can be increased in the radial direction as a distance from the rotor blade in the axial direction increases. Therefore, the magnetic bearing unit having a smaller outer diameter is arranged on the first end side (rotor blade side), and the motor unit having a larger outer diameter is arranged on the second end side such that the positions of the magnetic bearing unit and the motor unit in the axial direction can be made as close as possible to the rotor blade according to the shape of the installation space formed in the rotary body.

Consequently, according to the present invention, it is possible to provide the vacuum pump capable of reducing the dimension thereof in the axial direction.

MODES FOR CARRYING OUT THE INVENTION

An embodiment embodying the present invention is hereinafter described on the basis of the drawings.

Figure 1:
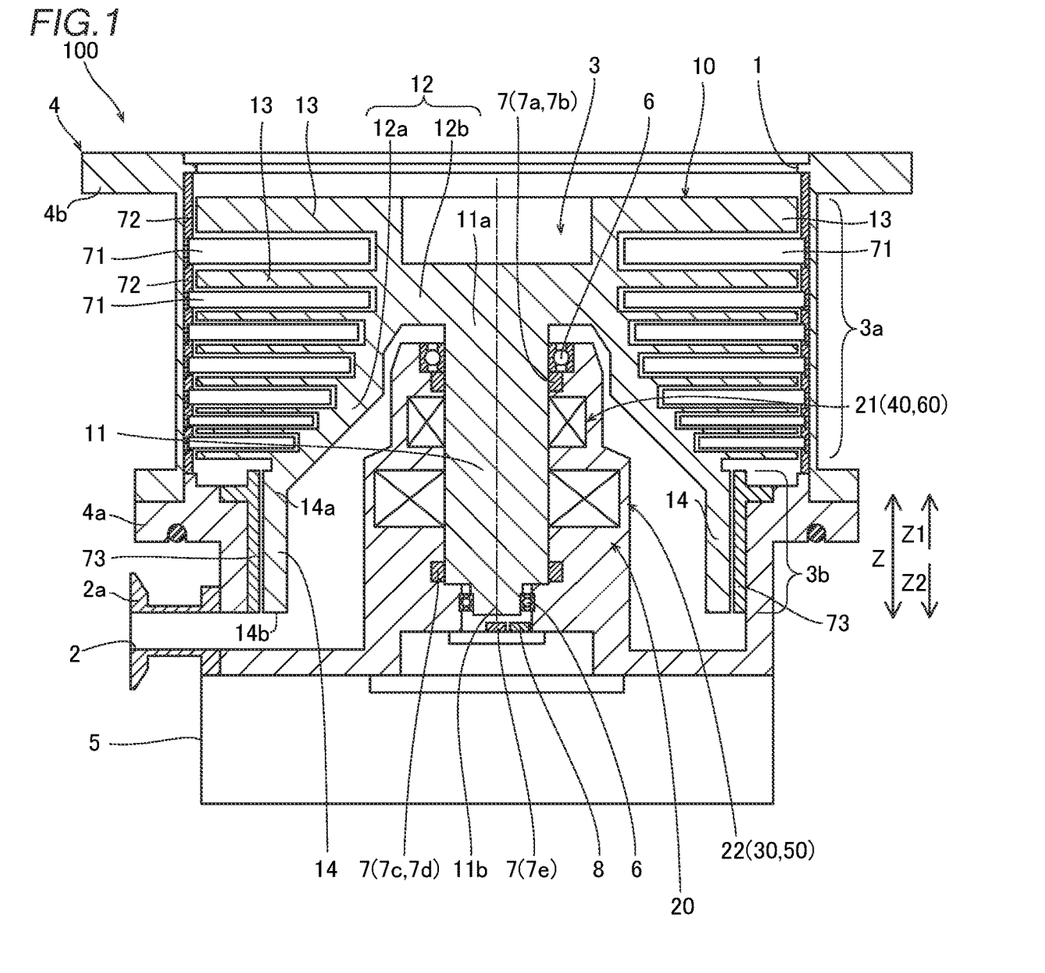
FIG. 1 is a sectional view schematically showing the overall configuration of a vacuum pump.

A vacuum pump 100 according to the embodiment is now described with reference to FIGS. 1 to 7.
Configuration of Vacuum Pump As shown in FIG. 1, the vacuum pump 100 is a pump to discharge gas from a container and evacuate (reducing the pressure) the container. The term "vacuum" refers to a state of pressure lower than the atmospheric pressure around the vacuum pump 100.

The vacuum pump 100 includes at least one intake port 1, at least one exhaust port 2, and at least one pump 3. The vacuum pump 100 suctions gas from the intake port 1 into the pump 3 by the operation of the pump 3, and discharges the suctioned gas from the exhaust port 2. The vacuum pump 100 includes a housing 4 to house the pump 3. In an example of FIG. 1, one intake port 1 is formed in the housing 4, and one pump 3 is housed in the housing 4. An exhaust pipe 2a formed with the exhaust port 2 is connected to the housing 4. The exhaust port 2 communicates with the intake port 1 via the exhaust pipe 2a and the pump 3.

In the example of FIG. 1, the vacuum pump 100 includes a control unit 5 to control the operation of the pump 3. The control unit 5 is attached to the bottom of the housing 4. The control unit 5 may be provided separately from the vacuum pump 100 and may be communicably connected to the vacuum pump 100 by wire or wirelessly.
Pump The pump 3 includes a rotary body 10 and a rotation mechanism 20. The rotary body 10 and the rotation mechanism 20 are housed in the housing 4. When the rotary body 10 is rotationally driven by the rotation mechanism 20, a gas suction force is generated between the rotary body 10 and the housing 4.

In the configuration example of FIG. 1, the pump 3 includes a first pump structure 3a and a second pump structure 3b. In the example of FIG. 1, the vacuum pump 100 is a composite vacuum pump with the first pump structure 3a and the second pump structure 3b connected in series. The gas taken into the pump 3 from the intake port 1 passes through the first pump structure 3a and the second pump structure 3b in this order, and is discharged from the exhaust port 2.

The rotary body 10 includes a rotary shaft 11, a blade support 12, and rotor blades 13. The rotary body 10 is provided such that the rotary shaft 11, the blade support 12, and the rotor blades 13 rotate integrally. The first pump structure 3a with the rotor blades 13 of the rotary body 10 and stator blades 71 of the housing 4 forms a turbomolecular pump. The rotary body 10 includes a cylindrical portion 14 extending from the blade support 12 toward a second end 11b of the rotary shaft 11 and forming the second pump structure 3b between the cylindrical portion 14 and the housing 4. The rotary body 10 is provided such that the rotor blades 13 forming the first pump structure 3a and the cylindrical portion 14 forming the second pump structure 3b rotate integrally. The second pump structure 3b with the cylindrical portion 14 of the rotary body 10 described below and a pump stator 73 of the housing 4 forms a molecular drag pump.

A direction in which the central axis of the rotary shaft 11 extends is hereinafter referred to as the axial direction or the thrust direction. The radial direction of the rotary shaft 11 is simply referred to as the radial direction. In each figure, the axial direction is defined as a Z direction. A Z1 direction in the Z direction is referred to as the first end 11a side, and a Z2 direction is referred to as the second end 11b side.

As shown in FIG. 1, the rotation mechanism 20 includes a motor 30 to rotationally drive the rotary body 10, a first radial magnetic bearing 40 and a second radial magnetic bearing 50 to support the rotary body 10 in the radial direction, and a thrust bearing to support the rotary body 10 in the axial direction. In this embodiment, the thrust bearing is a thrust magnetic bearing 60 provided around the rotary shaft. The rotation mechanism 20 is provided so as to surround the rotary shaft 11 centering on the rotary shaft 11.

The motor 30 includes a motor rotor 30b (see FIG. 4) provided on the rotary shaft 11 and a motor stator 30a (see FIG. 4) provided on the rotation mechanism 20.

The rotation mechanism 20 includes a 5-axis magnetic bearing including two sets of radial magnetic bearings and one set of thrust magnetic bearings.

That is, the rotation mechanism 20 includes the first radial magnetic bearing 40 and the second radial magnetic bearing 50, which are provided around the rotary shaft 11. The rotation mechanism 20 includes the thrust magnetic bearing 60 provided around the rotary shaft 11. The magnetic bearing magnetically levitates the rotary body 10 to support the rotary body 10 in non-contact with the rotary body 10 such that the rotary body 10 is rotatable.

One set of radial magnetic bearings enable a position control (two axes) in two radial directions (defined as an X direction and a Y direction) orthogonal to each other. Two sets of radial magnetic bearings arranged side by side in the axial direction enable an attitude control of tilt around the X direction and the Y direction. The thrust magnetic bearing enables a position control (one axis) in the thrust direction (Z direction). The magnetic bearing enables a 5-axis control of an X1 axis and a Y1 axis of the first radial magnetic bearing, an X2 axis and a Y2 axis of the second radial magnetic bearing, and a Z axis of the thrust magnetic bearing.

In this embodiment, the rotation mechanism 20 includes at least a magnetic bearing unit 21 and a motor unit 22. The magnetic bearing unit 21 is operable as the first radial magnetic bearing 40. In this embodiment, in the configuration example of FIG. 1, the magnetic bearing unit 21 is further operable as the thrust magnetic bearing 60. That is, the magnetic bearing unit 21 is a single unit that integrally includes the first radial magnetic bearing 40 and the thrust magnetic bearing 60. The motor unit 22 is a unit configured to be operable as both the motor 30 and the second radial magnetic bearing 50. Such a structure that operates as both the motor 30 and the second radial magnetic bearing 50 eliminates the need for a set of radial magnetic bearings usually provided separately from the motor, and thus it is called a bearingless motor or a self-bearing motor, for example. The detailed configuration of the magnetic bearing unit 21 and the motor unit 22 is described below.

The housing 4 includes a base 4a and a case 4b. The rotation mechanism 20 is provided on the base 4a, and the rotary shaft 11 of the rotary body 10 is inserted thereinto. The exhaust pipe 2a is connected to the base 4a. The case 4b is attached to the upper surface of the base 4a. The case 4b has a cylindrical shape so as to surround the rotary body 10 installed on the base 4a, and the intake port 1 is formed on the upper surface thereof.

The vacuum pump 100 includes a plurality of mechanical bearings 6, a plurality of displacement sensors 7, and a rotation sensor 8. The plurality of mechanical bearings 6 are provided on the base 4a in the vicinity of the first end 11a of the rotary shaft 11 and in the vicinity of the second end 11b of the rotary shaft 11. The mechanical bearings 6 can come into contact with the rotary shaft 11 to support the rotary shaft 11 in the radial direction and the thrust direction. The mechanical bearings 6 are touch-down bearings that support the rotary body 10 instead of the magnetic bearing when the magnetic bearing is not operating (when the rotary body 10 is not magnetically levitated) or when a disturbance occurs. When the magnetic bearing operates, the mechanical bearings 6 and the rotary shaft 11 (rotary body 10) do not contact each other.

Figure 3:
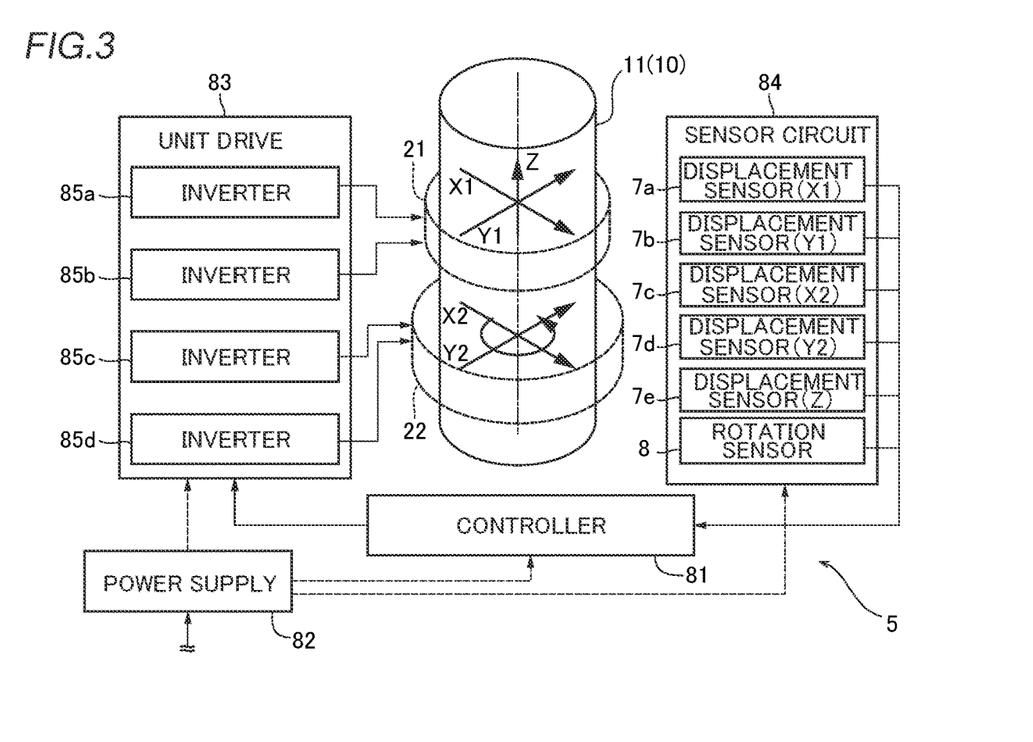
FIG. 3 is a block diagram illustrating the control configuration of the vacuum pump.

As shown in FIG. 3, the displacement sensors 7 include displacement sensors 7a to 7d that detect displacements of the rotary shaft 11 in the radial direction (an X1 direction, a Y1 direction, an X2 direction, and a Y2 direction), and a displacement sensor 7e that detects a displacement of the rotary shaft 11 in the thrust direction (Z direction). The rotation sensor 8 detects the rotation angle of the rotary shaft 11.

The control unit 5 includes a controller 81, a power supply 82, a unit drive 83, and a sensor circuit 84.

The power supply 82 acquires power from an external power supply and supplies power to the controller 81, the unit drive 83, and the sensor circuit 84. The power supply 82 performs power conversion to convert AC power from the outside into DC power.

The unit drive 83 controls supply of a drive current to the rotation mechanism 20 based on a control signal from the controller 81. The current is controlled in the unit drive 83 such that the motor 30 of the rotation mechanism 20 generates a driving force (torque) in the rotation direction, and the magnetic bearing generates a bearing force in each direction. The unit drive 83 includes inverters 85a and 85b to control current supply to the magnetic bearing unit 21. The unit drive 83 includes inverters 85c and 85d to control current supply to the motor unit 22. Each of the inverters 85a to 85d includes a plurality of switching elements.

The sensor circuit 84 includes the displacement sensors 7a to 7e and the rotation sensor 8, and includes a circuit that performs a conversion process to input each sensor signal to the controller 81, etc. Each sensor signal of the displacement sensors 7a to 7e and the rotation sensor 8 is input from the sensor circuit 84 to the controller 81.

The controller 81 includes a computer including a processor such as a central processing unit (CPU) or a field programmable gate array (FPGA) and a volatile and/or non-volatile memory.

The controller 81 controls the operation of the rotation mechanism 20 via the unit drive 83. The controller 81 acquires a sensor signal in each direction from the sensor circuit 84, and outputs a control signal to perform an on/off control on the plurality of switching elements provided in the inverters 85a, 85b, and 85d based on the acquired sensor signal. Thus, the controller 81 controls each magnetic bearing such that the rotary body 10 does not contact any fixed element of the vacuum pump 100 during the operation of the vacuum pump 100.

The controller 81 outputs a control signal to perform an on/off control on the plurality of switching elements provided in the inverter 85c based on the sensor signal of the rotation sensor 8. Thus, the controller 81 controls the motor 30 based on the rotation position of the rotary body 10.

Structure of Rotary Body

Figure 2:
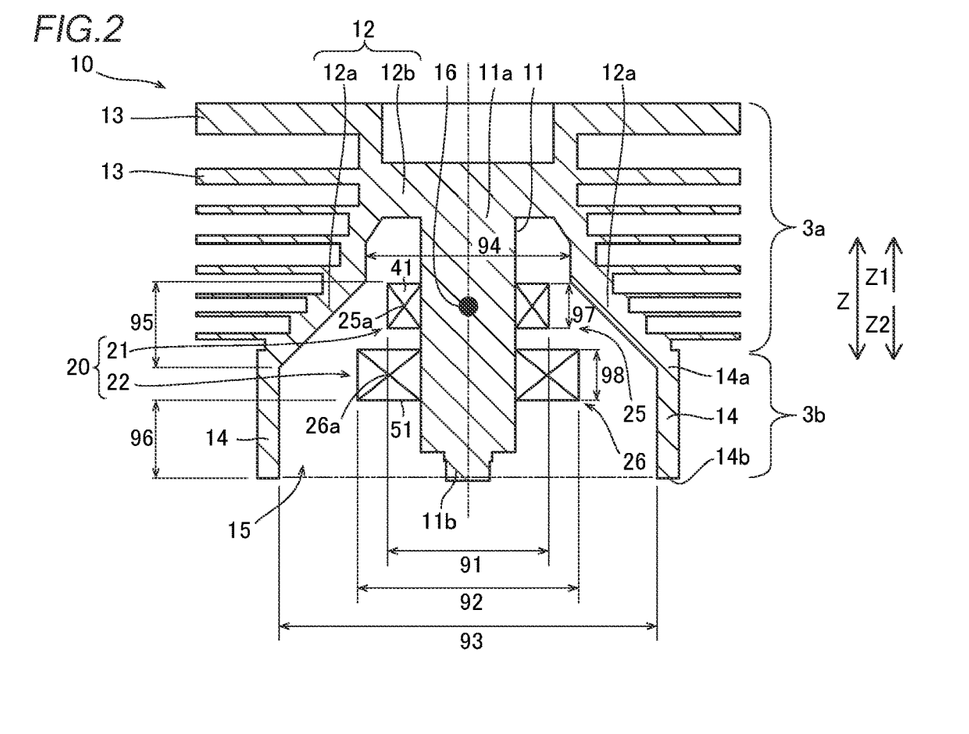
FIG. 2 is a schematic view showing an arrangement of a rotary body, a magnetic bearing unit, and a motor unit.

As shown in FIG. 2, the rotary shaft 11 is a columnar member having the first end 11a and the second end 11b and extending in the axial direction. In the example of FIG. 1, the first end 11a is the upper end of the rotary shaft 11, and the second end 11b is the lower end of the rotary shaft 11. The rotary shaft 11 is supported by the rotation mechanism 20 rotatably around the central axis. Furthermore, the rotary shaft 11 is rotationally driven around the central axis by the rotation mechanism 20. In the example of FIG. 1, an example of a vertical vacuum pump 100 including the rotary shaft 11 provided so as to extend along an upward-downward direction (vertical direction) is shown, but the direction of the rotary shaft 11 is not particularly limited. The rotary shaft 11 may be arranged in a horizontal direction or an oblique direction.

The blade support 12 is a portion of the rotary body 10 that mechanically connects the rotor blades 13 to the rotary shaft 11. The blade support 12 is connected to the first end 11a side of the rotary shaft 11. The blade support 12 extends so as to increase the inner diameter thereof from the first end 11a side toward the second end 11b side in the axial direction of the rotary shaft 11. That is, the blade support 12 has a roughly conical shape toward the first end 11a of the rotary shaft 11. The blade support 12 includes a tapered portion 12a that is inclined from the second end 11b side toward the first end 11a side of the rotary shaft 11. The blade support 12 includes a flange 12b extending in the radial direction from the first end 11a of the rotary shaft 11. The tapered portion 12a is mechanically connected to the outer peripheral end of the flange 12b.

The rotary body 10 includes a plurality of rotor blades 13. The rotor blades 13 are provided on the outer peripheral surface of the blade support 12. The rotor blades 13 extend in the radial direction from the outer peripheral surface of the blade support 12 to the vicinity of the inner peripheral surface of the housing 4.

As described above, the rotor blades 13 form the first pump structure 3a between the rotor blades 13 and the housing 4. The plurality of rotor blades 13 are provided in a plurality of stages at intervals in the axial direction. The plurality of rotor blades 13 are aligned along the outer peripheral surface of the tapered portion 12a and the outer peripheral surface of the flange 12b.

As shown in FIG. 1, a plurality of stator blades 71 are provided on the inner peripheral surface of the housing 4. Each stator blade 71 extends inward in the radial direction (toward the rotary shaft 11 side) from the inner peripheral surface of the housing 4. The plurality of stator blades 71 are arranged alternately with the plurality of rotor blades 13 one stage by one stage in the axial direction. Each stator blade 71 is placed on the base 4a via a spacer ring 72 stacked in the axial direction. The stacked spacer ring 72 is sandwiched between the base 4a and the case 4b such that each stator blade 71 is positioned. Thus, the pump 3 includes the first pump structure 3a including the rotor blades 13 (moving blades) of the rotary body 10 and the stator blades 71 (stationary blades) of the housing 4.

The cylindrical portion 14 has a cylindrical shape coaxial with the rotary shaft 11. The cylindrical portion 14 includes a first cylindrical end 14a connected to the blade support 12 and a second cylindrical end 14b on the side opposite to the blade support 12 in the axial direction of the rotary shaft 11. The cylindrical portion 14 extends linearly along the axial direction from the first cylindrical end 14a connected to the tapered portion 12a to the second cylindrical end 14b.

The cylindrical pump stator 73 is provided on the inner peripheral surface of the housing 4. The inner peripheral surface of the pump stator 73 faces the outer peripheral surface of the cylindrical portion 14 in the radial direction with a small interval. A thread groove (not shown) is formed on the inner peripheral surface of the pump stator 73. Thus, the pump 3 includes the second pump structure 3b including the cylindrical portion 14 of the rotary body 10 and the pump stator 73 of the housing 4. The thread groove (not shown) may be formed on either the outer peripheral surface of the cylindrical portion 14 or the inner peripheral surface of the pump stator 73.

Structure of Rotation Mechanism

In the example of FIG. 1, the rotation mechanism 20 includes two units of the magnetic bearing unit 21 and the motor unit 22.

The magnetic bearing unit 21 is provided around the rotary shaft 11 between the rotary shaft 11 and the blade support 12. The motor unit 22 is provided around the rotary shaft 11 at a position closer to the second end 11b of the rotary shaft 11 than the magnetic bearing unit 21.

Motor Unit

Figure 4:
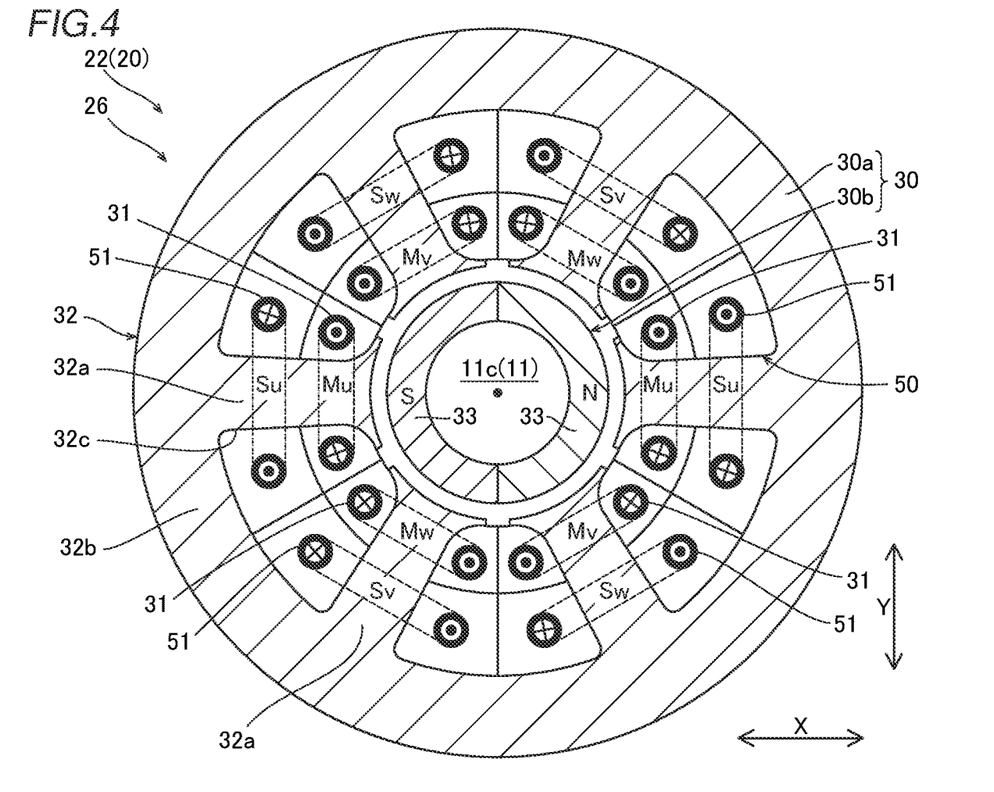
FIG. 4 is a schematic sectional view showing the motor unit as viewed in the axial direction.

As shown in FIG. 4, the motor unit 22 (motor stator 30a) includes motor coils 31 forming the motor 30, second coils 51 forming the second radial magnetic bearing 50, and a stator core 32 around which the motor coils 31 and the second coils 51 are wound in a plane orthogonal to the axial direction of the rotary shaft 11.

In other words, in the motor unit 22 illustrated in FIG. 4, the second coils 51 of the second radial magnetic bearing 50 are further assembled to the motor stator 30a including the motor coils 31 and the stator core 32.

The stator core 32 includes a plurality of teeth 32a and a stator yoke 32b. The stator yoke 32b is formed in an annular shape so as to surround the rotary shaft 11. The plurality of teeth 32a extend in the radial direction from the inner peripheral surface of the stator yoke 32b toward the center of the rotary shaft 11. The plurality of teeth 32a are arranged at equal angular intervals in the circumferential direction, and a slot 32c is formed between the adjacent teeth 32a to house the coils.

The motor coils 31 and the second coils 51 are wound around the respective teeth 32a. In FIG. 4, the motor coils 31 and the second coils 51 are arranged side by side in the radial direction in the plane orthogonal to the axial direction of the rotary shaft 11. That is, both the motor coils 31 and the second coils 51 are arranged in the same slot 32c. In an example of FIG. 4, the motor coils 31 are arranged inside in the radial direction, and the second coils 51 are arranged outside in the radial direction.

The motor coils 31 and the second coils 51 are separate coils and are electrically insulated from each other. The motor coils 31 are electrically connected to the inverter 85c (see FIG. 3), and the second coils 51 are electrically connected to the inverter 85d (see FIG. 3). The inverter 85c supplies three-phase currents (U-phase, V-phase, and W-phase) to the motor 30, for example. The motor 30 includes three sets of motor coils 31 (Mu, Mv, and Mw) to which three-phase currents of U-phase, V-phase, and W-phase are supplied, respectively. The inverter 85d supplies three-phase currents (U-phase, V-phase, and W-phase) to the second radial magnetic bearing 50, for example. The second radial magnetic bearing 50 includes three sets of second coils 51 (Su, Sv, and Sw) to which three-phase currents of U-phase, V-phase, and W-phase are supplied, respectively.

The motor rotor 30b is provided on the rotary shaft 11 so as to rotate integrally with the rotary shaft 11. That is, the rotary shaft 11 is provided with permanent magnets 33 at a position (the same position in the axial direction) facing the stator core 32 in the radial direction with a gap. In the example of FIG. 4, the permanent magnet 33 magnetized to the N pole is provided over one circumferential half of the rotary shaft 11, and the permanent magnet 33 magnetized to the S pole is provided over the other circumferential half of the rotary shaft 11.

Although FIG. 4 shows an example of a 2-pole and 6-slot structure, the number of poles and the number of slots are not particularly limited. Furthermore, in FIG. 4, each winding method for the motor coils 31 and the second coils 51 is not limited to a concentrated winding method, and may be another winding method such as a distributed winding method.

Figure 5:
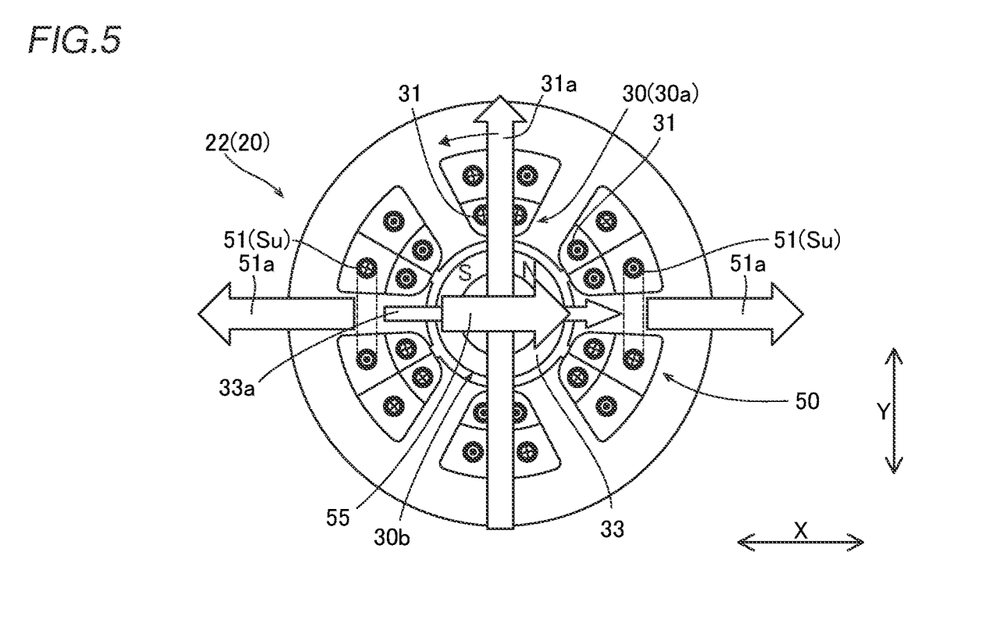
FIG. 5 is a schematic view illustrating the operation of the motor unit.

As shown in FIG. 5, the controller 81 (see FIG. 3) causes a current to be supplied to each motor coil 31 via the inverter 85c (see FIG. 3), and causes magnetic fluxes 31a of the motor coils 31 and magnetic fluxes 33a of the permanent magnets 33 to interact with each other. That is, the motor 30 applies attractive and repulsive acting forces to the magnetic poles of the permanent magnets 33 by the magnetic fluxes 31a of the motor coils 31. The controller 81 generates the rotating magnetic fluxes 31a by switching the motor coils 31 that supply a current according to the rotation angle position of the rotary body 10, and rotates the rotary body 10 at a desired rotation speed. The rotation speed of the rotary body 10 by the motor 30 is 10,000 rpm or more and 100,000 rpm or less, for example.

The controller 81 (see FIG. 3) causes a current to be supplied to the second coils 51 via the inverter 85d (see FIG.

3), and forms the coarseness and fineness of the combined magnetic flux in the gap between the rotary shaft (motor rotor 30b) and the stator core 32 (motor stator 30a) by interaction between the magnetic fluxes 51a of the second coils 51 and the magnetic fluxes 33a of the permanent magnets 33. Consequently, the second radial magnetic bearing 50 applies a bearing force 55 to the rotary shaft 11 in a direction in which the magnetic fluxes 51a of the second coils 51 and the magnetic fluxes 33a of the permanent magnets 33 strengthen each other.

For example, in FIG. 5, magnetic fluxes 51a of the two second coils 51 (Su) and the magnetic fluxes 33a strengthen each other in the gap on the north pole side of the motor rotor 30b, and weaken each other in the gap on the south pole side of the motor rotor 30b. Thus, the bearing force 55 acts toward the north pole side (the right side in the figure) with a large amount of magnetic flux. FIG. 5 illustrates the U-phase second coils 51 (Su), but the strength and direction of the current supplied to each second coil 51 are controlled such that a bearing force 55 of any strength can be generated in any radial direction. The controller 81 controls current supply to the second coils 51 based on the sensor signals of the displacement sensors 7c and 7d and the rotation sensor 8 (see FIG. 3) so as to control the bearing force 55 of the second radial magnetic bearing 50 such that the rotary body 10 maintains a non-contact state in the radial direction.

Magnetic Bearing Unit

Figure 6:
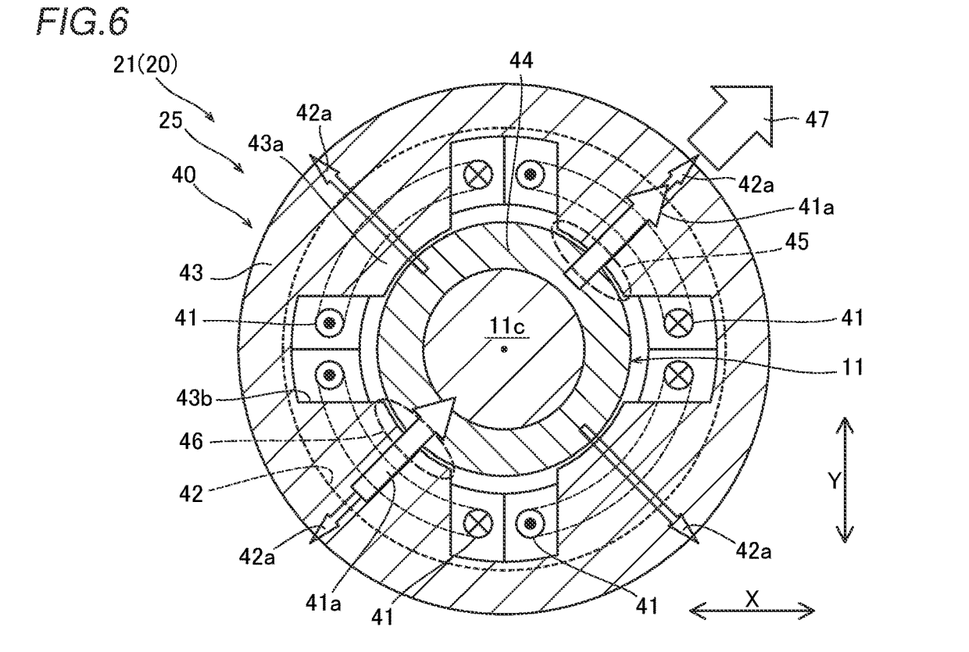
FIG. 6 is a schematic sectional view showing a first radial magnetic bearing of the magnetic bearing unit as viewed in the axial direction.
Figure 7:
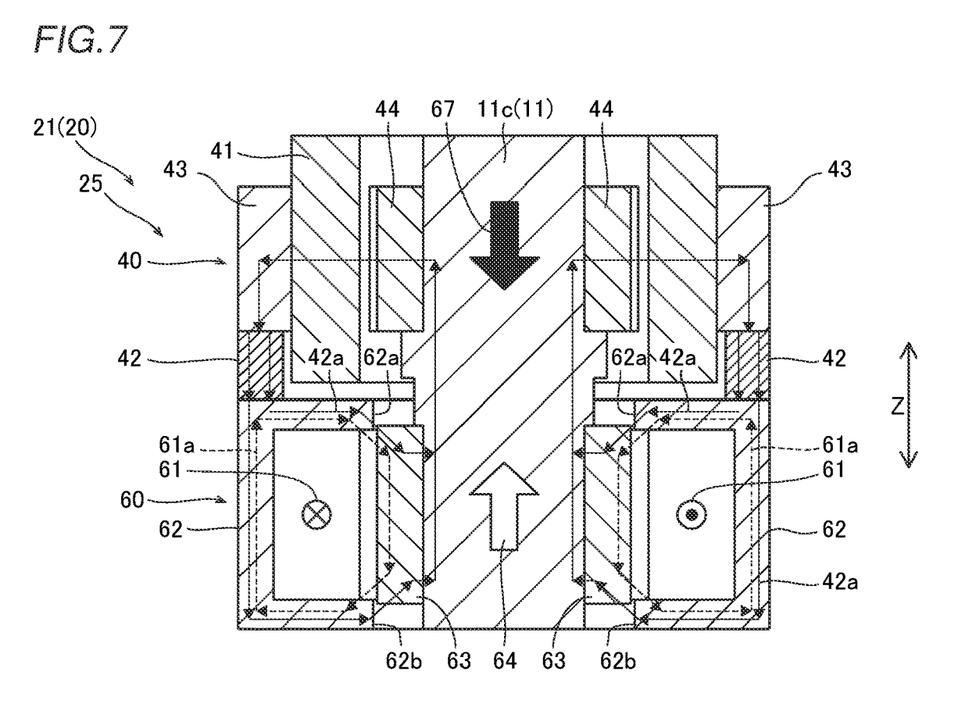
FIG. 7 is a schematic sectional view showing the magnetic bearing unit as viewed in the radial direction.

As shown in FIG. 6, the magnetic bearing unit 21 includes first coils 41 forming the first radial magnetic bearing 40. As shown in FIG. 7, in this embodiment, the magnetic bearing unit 21 includes a thrust coil 61 forming the thrust magnetic bearing 60. Furthermore, the magnetic bearing unit 21 includes a magnet 42 that generates a magnetic flux that interacts with both the first radial magnetic bearing 40 and the thrust magnetic bearing 60.

As shown in FIG. 6, the first radial magnetic bearing 40 includes a first bearing core 43 to which the first coils 41 are attached. The first bearing core 43 is formed in an annular shape so as to surround the rotary shaft 11. The first bearing core 43 includes a plurality of slots 43b between a plurality of teeth 43a arranged at intervals in the circumferential direction. In FIG. 6, a total of four first coils 41 are attached to four slots 43b, respectively. The first coils 41 generate magnetic fluxes 41a in the radial direction by current supply.

The rotary shaft 11 is provided with a first core 44 on the outer periphery of a shaft 11c. The first core 44 has an annular shape and faces the first bearing core 43 in the radial direction.

As shown in FIG. 7, the thrust magnetic bearing 60 is integrated with the first radial magnetic bearing 40 adjacent thereto in the axial direction. The thrust magnetic bearing 60 includes a thrust core 62 to which the thrust coil 61 is attached. The thrust core 62 is formed in an annular shape so as to surround the rotary shaft 11. The thrust core 62 has a C-shaped section in which the inside in the radial direction is open in a longitudinal section (section shown in FIG. 7) along the axial direction. That is, the thrust core 62 has a first end face 62a and a second end face 62b on the inner side in the radial direction. The thrust coil 61 is arranged inside the C-shaped thrust core 62, and is wound in an annular shape around a winding axis in the axial direction so as to surround the rotary shaft 11.

The magnet 42 is arranged between the first radial magnetic bearing 40 and the thrust magnetic bearing 60 in the axial direction. That is, the magnet 42 is arranged between the first bearing core 43 and the thrust core 62. The magnet 42 is provided so as to connect the first bearing core 43 to the thrust core 62. The magnet 42 is formed in an annular shape so as to surround the rotary shaft 11. The magnet 42 is a permanent magnet and is magnetized in the axial direction. In an example of FIG. 7, a surface of the magnet 42 that faces the first bearing core 43 in the axial direction is magnetized to the S pole, and a surface of the magnet 42 that faces the thrust core 62 in the axial direction is magnetized to the N pole.

The rotary shaft 11 is provided with a second core 63 on the outer periphery of the shaft 11c. The second core 63 has an annular shape and faces the thrust core 62 in the radial direction.

In the magnetic bearing unit 21, the magnet 42 generates a magnetic flux that passes through the first bearing core 43 and the thrust core 62. That is, the magnet 42 forms a bias magnetic flux 42a in a path that passes through the thrust core 62, a gap between the rotary shaft 11 and the core, the second core 63, the shaft 11c (rotary shaft 11), the first core 44, a gap between the rotary shaft 11 and the core, and the first bearing core 43 in this order from the north pole of the magnet 42 and returns to the south pole of the magnet 42.

Therefore, in the first radial magnetic bearing 40 shown in FIG. 6, the bias magnetic flux 42a passes through each tooth 43a of the first bearing core 43 toward the outer side in the radial direction. The controller 81 (see FIG. 3) causes a current to be supplied to the first coils 41 via the inverter 85a (see FIG. 3), and forms the coarseness and fineness of the combined magnetic flux in the gap between the rotary shaft 11 and the first bearing core 43 by interaction between the magnetic fluxes 41a of the first coils 41 and the bias magnetic flux 42a of the magnet 42. Consequently, the first radial magnetic bearing 40 applies a bearing force 47 to the rotary shaft 11 in a direction in which the magnetic fluxes 41a of the first coils 41 and the bias magnetic flux 42a of the magnet 42 strengthen each other.

For example, in FIG. 6, the magnetic fluxes 41a of the two first coils 41 and the bias magnetic flux 42a of the magnet 42 strengthen each other in a gap 45 and weaken each other in a gap 46 on the opposite side of the gap 45, and thus the bearing force 47 acts toward the gap 45 side (in an upper right direction in the figure) with a large amount of magnetic flux. The strength and direction of the current supplied to each first coil 41 are controlled such that a bearing force 47 of any strength can be generated in any radial direction. The controller 81 switches current supply to each first coil 41 based on the sensor signals of the displacement sensors 7a and 7b and the rotation sensor 8 (see FIG. 3) so as to control the bearing force 47 of the first radial magnetic bearing 40 such that the rotary body 10 maintains a non-contact state in the radial direction.

On the other hand, as shown in FIG. 7, the bias magnetic flux 42a passes through the gap from each of the first end face 62a and the second end face 62b of the thrust core 62, enters the second core 63, and passes through the rotary shaft 11 in the axial direction. The controller 81 (see FIG. 3) causes a current to be supplied to the thrust coil 61 via the inverter 85b (see FIG. 3), and forms the coarseness and fineness of the combined magnetic flux in the gap between the rotary shaft 11 and the thrust core 62 by interaction between a magnetic flux 61a of the thrust coil 61 and the bias magnetic flux 42a of the magnet 42. Consequently, the thrust magnetic bearing 60 applies a bearing force 64 to the rotary shaft 11 in a direction in which the magnetic flux 61a of the thrust coil 61 and the bias magnetic flux 42a of the magnet 42 strengthen each other.

For example, in FIG. 7, the magnetic fluxes strengthen each other in the gap on the first end face 62a side, and the magnetic fluxes weaken each other in the gap on the second end face 62b side. Thus, a bearing force 64 in the axial direction acts toward the first end face 62a side (an upward direction in the figure) with a large amount of magnetic flux. When a current in the opposite direction is supplied to the thrust coil 61, the bearing force 64 is generated on the opposite side in the axial direction. The strength and direction of the current supplied to the thrust coil 61 are controlled such that the bearing force 64 of any strength can be generated in the thrust direction. The controller 81 switches current supply to the thrust coil 61 based on the sensor signal of the displacement sensor 7e so as to control the bearing force 64 of the thrust magnetic bearing 60 such that the rotary body 10 maintains a non-contact state in the axial direction. In the vertical vacuum pump 100, the weight 67 of the rotary body 10 is supported by the bearing force 64.

Thus, in this embodiment, the thrust magnetic bearing 60 includes the magnet 42 and the thrust coil 61 that generate magnetic fluxes that pass through the rotary shaft 11 in the axial direction, and the magnetic flux 42a of the magnet 42 interacts with the magnetic flux 61a of the thrust coil 61 such that the bearing force 64 in the thrust direction is generated for the rotary shaft 11.

Arrangement of Magnetic Bearing Unit and Motor Unit

An arrangement of the magnetic bearing unit 21 and the motor unit 22 is now described with reference to FIGS. 1 and 2.

As shown in FIG. 2, the magnetic bearing unit 21 is arranged at a first axial position 25 in the axial direction of the rotary shaft 11. The magnetic bearing unit 21 has a first outer diameter 91. The motor unit 22 is arranged at a second axial position 26 in the axial direction. As described above, the second axial position 26 is a position closer to the second end 11b of the rotary shaft 11 than the first axial position 25. The motor unit 22 has a second outer diameter 92 that is larger than the first outer diameter 91.

The rotary body 10 includes a housing space 15 to arrange the rotation mechanism 20 therein between the rotary shaft 11 and the blade support 12. The housing space 15 of the rotary body 10 is a concave space of the rotary body 10 partitioned by the inner peripheral surfaces of the blade support 12 and the cylindrical portion 14. The magnetic bearing unit 21 is arranged in a first portion of the housing space 15 at the first axial position 25. The motor unit 22 is arranged in a second portion of the housing space 15 at the second axial position 26. The second portion of the housing space 15 is wider in the radial direction than the first portion of the housing space 15.

Specifically, the housing space 15 has a shape that extends cylindrically in the axial direction from the second end 11b side toward the first end 11a, reflecting the shapes of the blade support 12 and the cylindrical portion 14, and then tapers toward the first end 11a to reduce the diameter thereof. The housing space 15 has an inner diameter 93 in a forming region of the cylindrical portion 14 of the rotary body 10 on the second end 11b side, and the inner diameter is reduced in a tapered shape from the inner diameter 93 to an inner diameter 94 in a forming region of the tapered portion 12a.

In an example of FIG. 2, the first outer diameter 91 of the magnetic bearing unit 21 is smaller than the inner diameter 93 and the inner diameter 94. On the other hand, the second outer diameter 92 of the motor unit 22 is smaller than the inner diameter 93 and is equal to or larger than the inner diameter 94. Therefore, among the two units, the magnetic bearing unit 21 is arranged on the first end 11a side such that each unit can be arranged closer to the first end 11a due to the smaller first outer diameter 91, as compared with a case in which the motor unit 22 is arranged on the first end 11a side.

More specifically, in the configuration example of FIG. 2, the magnetic bearing unit 21 is arranged between the rotary shaft 11 and the tapered portion 12a in the plane orthogonal to the axial direction of the rotary shaft 11. The magnetic bearing unit 21 is arranged closer to the first end 11a (Z1 direction side) than an end (a boundary with the first cylindrical end 14a of the cylindrical portion 14) of the tapered portion 12a on the second end 11b side (Z2 direction side) in the axial direction of the rotary shaft 11. The tapered portion 12a is provided within a length 95 in the axial direction, and the magnetic bearing unit 21 is housed within the length 95 within which the tapered portion 12a is provided.

In the configuration example of FIG. 2, at least a portion of the motor unit 22 is arranged in the housing space 15 partitioned by the inner peripheral surface of the blade support 12 and the inner peripheral surface of the cylindrical portion 14. In the axial direction, the motor unit 22 is arranged on the first cylindrical end 14a side relative to the second cylindrical end 14b of the cylindrical portion 14. That is, the motor unit 22 is spaced apart from the second cylindrical end 14b of the cylindrical portion 14 toward the first end 11a by a distance 96. Furthermore, in the configuration example of FIG. 2, at least a portion of the motor unit 22 is arranged on the first end 11a side relative to the end of the tapered portion 12a on the second end 11b side (Z2 direction side). That is, a portion of the motor unit 22 is arranged between the rotary shaft 11 and the tapered portion 12a in the plane orthogonal to the axial direction of the rotary shaft 11.

Therefore, in the configuration example shown in FIG. 2, both the magnetic bearing unit 21 and the motor unit 22 forming the rotation mechanism 20 are housed inside the housing space 15 without protruding in the Z2 direction from an end (the second cylindrical end 14b of the cylindrical portion 14) of the housing space 15 formed in the rotary body 10.

The rotary body 10 has a center of gravity 16 on the rotary shaft 11. Focusing on the positional relationship between the center of gravity 16 of the rotary body 10 and each unit of the rotation mechanism 20, the center 25a of the first coil 41 of the magnetic bearing unit 21 is closer to the center of gravity 16 of the rotary body 10 than the center 26a of the second coil 51 of the motor unit 22 in the axial direction of the rotary shaft 11. That is, in the axial direction, the center of gravity 16 is located on the first end 11a side (Z1 direction side) relative to a midpoint between the center 25a of the first coil 41 and the center 26a of the second coil 51.

In the configuration example of FIG. 2, a forming range 97 of the magnetic bearing unit 21 in the axial direction and the position of the center of gravity 16 of the rotary body 10 in the axial direction overlap each other. That is, the magnetic bearing unit 21 is formed over a length 97 between both ends in the axial direction. The center of gravity 16 of the rotary body 10 is arranged within the forming range 97 of the magnetic bearing unit 21 in the axial direction. The motor unit 22 is formed over a length 98 (forming range 98) between both ends in the axial direction at the second axial position 26.

Advantages of this Embodiment

In this embodiment, the following advantages are obtained.

In this embodiment, as described above, the motor unit 22 configured to be operable as both the motor 30 and the second radial magnetic bearing 50 is provided. Accordingly, the motor 30 and the second radial magnetic bearing 50 are integrated into a single unit, and thus as compared with a case in which the motor 30 and the second radial magnetic bearing 50 are arranged separately in the axial direction, the dimension of a region occupied by the unit in the axial direction can be reduced. Furthermore, in the motor unit 22 with the motor 30 and the second radial magnetic bearing 50 integrated into a single unit, as compared with a unit including only the motor 30 without the second radial magnetic bearing 50, for example, the dimension in the axial direction or the dimension in the radial direction tends to increase. In this embodiment, the motor unit 22 has the second outer diameter 92 larger than the first outer diameter 91 of the magnetic bearing unit 21, and thus although the dimension in the radial direction increases, an increase in the dimension (length 98) of the motor unit 22 in the axial direction can be significantly reduced or prevented.

Furthermore, focusing on the rotary body 10, in a structure including the rotor blades 13 on the first end 11a side of the rotary shaft 11, an installation space (housing space 15) for the motor 30 and the magnetic bearing that can be ensured around the rotary shaft 11 can be increased in the radial direction as a distance from the rotor blades 13 in the axial direction (Z2 direction) increases. Therefore, the magnetic bearing unit 21 having a smaller outer diameter is arranged on the first end 11a side (rotor blade 13 side), and the motor unit 22 having a larger outer diameter is arranged on the second end 11b side such that the positions (25, 26) of the magnetic bearing unit 21 and the motor unit 22 in the axial direction can be made as close as possible to the rotor blades 13 according to the shape of the installation space (housing space 15) formed in the rotary body 10. Consequently, according to this embodiment, it is possible to provide the vacuum pump 100 capable of reducing the dimension thereof in the axial direction.

In the aforementioned embodiment, with the following configuration, further advantages are obtained.

That is, in the aforementioned embodiment, the motor unit 22 includes the motor coils 31 configured to form the motor 30, the second coils 51 configured to form the second radial magnetic bearing 50, and the stator core 32 around which the motor coils 31 and the second coils 51 are wound in the plane orthogonal to the axial direction of the rotary shaft 11. Accordingly, the motor coils 31 and the second coils 51 are provided in the common stator core 32, and thus as compared with a case in which the motor coils 31 and the second coils 51 are provided in separate cores, the motor unit 22 can be downsized, and the number of components can be reduced. The motor coils 31 and the second coils 51 are arranged in the same plane orthogonal to the axial direction of the rotary shaft 11, and thus the motor 30 and the second radial magnetic bearing 50 can be integrated into a single unit without increasing the dimension of the motor unit 22 in the axial direction.

In this embodiment, as described above, the thrust bearing includes the thrust magnetic bearing 60 provided around the rotary shaft 11. The thrust magnetic bearing 60 includes the magnet 42 and the thrust coil 61 configured to generate magnetic fluxes that pass through the rotary shaft 11 in the axial direction, respectively, and is configured to generate the bearing force 64 in the thrust direction in the rotary shaft 11 by interaction between the magnetic flux of the magnet 42 and the magnetic flux of the thrust coil 61. It is known that the magnetic bearing in the thrust direction includes a disk portion protruding in the radial direction from the outer peripheral surface on the rotary shaft 11, and a bearing force in the thrust direction is generated by applying a magnetic force in the axial direction from a coil pair arranged so as to sandwich the disk portion in the axial direction. In this configuration, the disk portion and the coil pair are aligned in the axial direction, and thus the dimension in the axial direction is increased. In this regard, according to the aforementioned embodiment, the magnetic fluxes (42a, 61a) that pass through the rotary shaft 11 are generated from the magnet 42 and the thrust coil 61, respectively, and the bearing force 64 in the axial direction is generated due to the interaction between these magnetic fluxes, and thus it is not necessary to provide the disk portion, or it is not necessary to provide the coil pair so as to sandwich the disk portion. Therefore, the dimension of the thrust magnetic bearing 60 in the axial direction can be reduced, and thus the dimension of the vacuum pump 100 in the axial direction can be reduced accordingly.

In this embodiment, as described above, the magnetic bearing unit 21 is configured to be operable as the thrust magnetic bearing. That is, the magnetic bearing unit 21 is a single unit integrally including the first radial magnetic bearing 40 and the thrust magnetic bearing 60. Accordingly, the motor 30 and the second radial magnetic bearing 50 can be integrated into the single motor unit 22, and the first radial magnetic bearing 40 and the thrust magnetic bearing 60 can be further integrated into a single unit. That is, four units of the motor 30, the first radial magnetic bearing 40, the second radial magnetic bearing 50, and the thrust magnetic bearing 60, which are conventionally provided separately, can be integrated into two units of the magnetic bearing unit 21 and the motor unit 22. Consequently, the number of units aligned in the axial direction can be reduced, and thus the dimension of the vacuum pump 100 in the axial direction can be effectively reduced.

In this embodiment, as described above, the magnetic bearing unit 21 includes the first coils 41 configured to form the first radial magnetic bearing 40, the thrust coil 61 configured to form the thrust magnetic bearing 60, and the magnet 42 configured to generate the magnetic flux 42a that interacts with both the first radial magnetic bearing 40 and the thrust magnetic bearing 60. Accordingly, using the common magnet 42, the bearing force 47 (see FIG. 6) in the radial direction and the bearing force 64 (see FIG. 7) in the thrust direction can be generated. Therefore, as compared with a case in which magnets 42 are provided separately, the magnetic bearing unit 21 can be downsized, and the number of components can be reduced.

In this embodiment, as described above, the rotary body 10 has a center of gravity 16 on the rotary shaft 11, and the center 25a of the first coil 41 of the magnetic bearing unit 21 is located closer to the center of gravity 16 of the rotary body 10 than the center 26a of the second coil 51 of the motor unit 22 in the axial direction of the rotary shaft 11. Accordingly, the magnetic bearing unit 21 is arranged closer to the center of gravity 16 of the rotary body 10 than the motor unit 22. Therefore, with respect to support of the rotary body 10 in the radial direction, the action of the bearing force by the magnetic bearing unit 21 (first radial magnetic bearing 40) is relatively large, and the action of the bearing force by the motor unit 22 (second radial magnetic bearing 50) is relatively small. Unlike the motor unit 22, in the magnetic bearing unit 21, it is not necessary to consider the structure of the motor 30, and a structure that prioritizes bearing performance can be adopted. Therefore, the magnetic bearing unit 21 that can easily ensure bearing performance can be used as a main bearing, and the motor unit 22 (second radial magnetic bearing 50) that performs support can be used as a sub-bearing. Thus, even when the motor 30 and the second radial magnetic bearing 50 are integrated, high bearing performance can be easily ensured.

In this embodiment, as described above, the forming range 97 of the magnetic bearing unit 21 in the axial direction and the position of the center of gravity 16 of the rotary body 10 in the axial direction overlap each other. Accordingly, the bearing force 47 of the magnetic bearing unit 21 (first radial magnetic bearing 40) can be applied to the rotary body 10 more effectively. Therefore, the bearing force 47 of the magnetic bearing unit 21 (first radial magnetic bearing 40) can be reduced, and thus the magnetic bearing unit 21 can be downsized. In the motor unit 22 (second radial magnetic bearing 50), it is only necessary to significantly reduce or prevent tilting of the rotary shaft 11 of the rotary body 10 around the center of gravity 16, and thus the required bearing force 55 can be reduced. Therefore, the motor unit 22 can be configured to further prioritize the performance of the motor 30, and thus the performance of the vacuum pump 100 can be easily ensured while the dimension in the axial direction is reduced.

In this embodiment, as described above, the blade support 12 includes the tapered portion 12a inclined from the second end 11b side toward the first end 11a side of the rotary shaft 11, and the magnetic bearing unit 21 is arranged between the rotary shaft 11 and the tapered portion 12a in the plane orthogonal to the axial direction of the rotary shaft 11. Accordingly, a tapered region (housing space 15) can be formed in a space ensured around the rotary shaft 11 in the rotary body 10. In this case, the magnetic bearing unit 21 can be brought as close as possible to the first end 11a within a range in which the magnetic bearing unit 21 having the first outer diameter 91 does not interfere with the tapered portion 12a. As the magnetic bearing unit 21 is closer to the first end 11a, the motor unit 22 can also be brought closer to the first end 11a, and thus the dimension of the vacuum pump 100 in the axial direction can be reduced accordingly.

In this embodiment, as described above, the magnetic bearing unit 21 is arranged on the first end 11a side (Z1 direction side) relative to the end of the tapered portion 12a on the second end 11b side (Z2 direction side) in the axial direction of the rotary shaft 11. Accordingly, in the axial direction, the magnetic bearing unit 21 can be housed within the forming range (length 95) of the tapered portion 12a. Therefore, the dimension of the vacuum pump 100 in the axial direction can be further reduced.

In this embodiment, as described above, the vacuum pump 100 further includes the housing 4 configured to house the rotary body 10 and the rotation mechanism 20, the rotor blades 13 form the first pump structure 3a between the rotor blades 13 and the housing 4, the rotary body 10 includes the cylindrical portion 14 that extends from the blade support 12 toward the second end 11b of the rotary shaft 11 and forms the second pump structure 3b between the cylindrical portion 14 and the housing 4, and at least a portion of the motor unit 22 is arranged in the housing space 15 partitioned by the inner peripheral surface of the blade support 12 and the inner peripheral surface of the cylindrical portion 14. Accordingly, the entire motor unit 22 can be housed inside the housing space 15 formed between the rotary shaft 11 of the rotary body 10 and both the blade support 12 and the cylindrical portion 14, or even when the motor unit 22 protrudes outward from the housing space 15, the amount of protrusion can be reduced. Therefore, the dimension of the vacuum pump 100 in the axial direction can be effectively reduced.

In this embodiment, as described above, the cylindrical portion 14 includes the first cylindrical end 14a connected to the blade support 12 and the second cylindrical end 14b on the side opposite to the blade support 12 in the axial direction of the rotary shaft 11, and in the axial direction, the motor unit 22 is arranged on the first cylindrical end 14a side relative to the second cylindrical end 14b of the cylindrical portion 14. Accordingly, the entire motor unit 22 can be housed inside the housing space 15 formed between the rotary shaft 11 of the rotary body 10 and both the blade support 12 and the cylindrical portion 14. Therefore, the dimension of the vacuum pump 100 in the axial direction can be more effectively reduced.

Modified Examples

The embodiment disclosed this time must be considered as illustrative in all points and not restrictive. The scope of the present invention is not shown by the above description of the embodiment but by the scope of claims for patent, and all modifications (modified examples) within the meaning and scope equivalent to the scope of claims for patent are further included.

For example, while the example in which the magnetic bearing unit 21 is configured as a single unit integrally including the first radial magnetic bearing 40 and the thrust magnetic bearing 60, and the rotation mechanism 20 includes two units of the magnetic bearing unit 21 and the motor unit 22 has been shown in the aforementioned embodiment, the present invention is not limited to this. In a modified example shown in FIGS. 8 to 10, a magnetic bearing unit including a first radial magnetic bearing and a thrust magnetic bearing are separately provided. Therefore, FIGS. 8 to 10 show an example in which a rotation mechanism includes three units of the magnetic bearing unit, a motor unit, and the thrust magnetic bearing.

Figure 8:
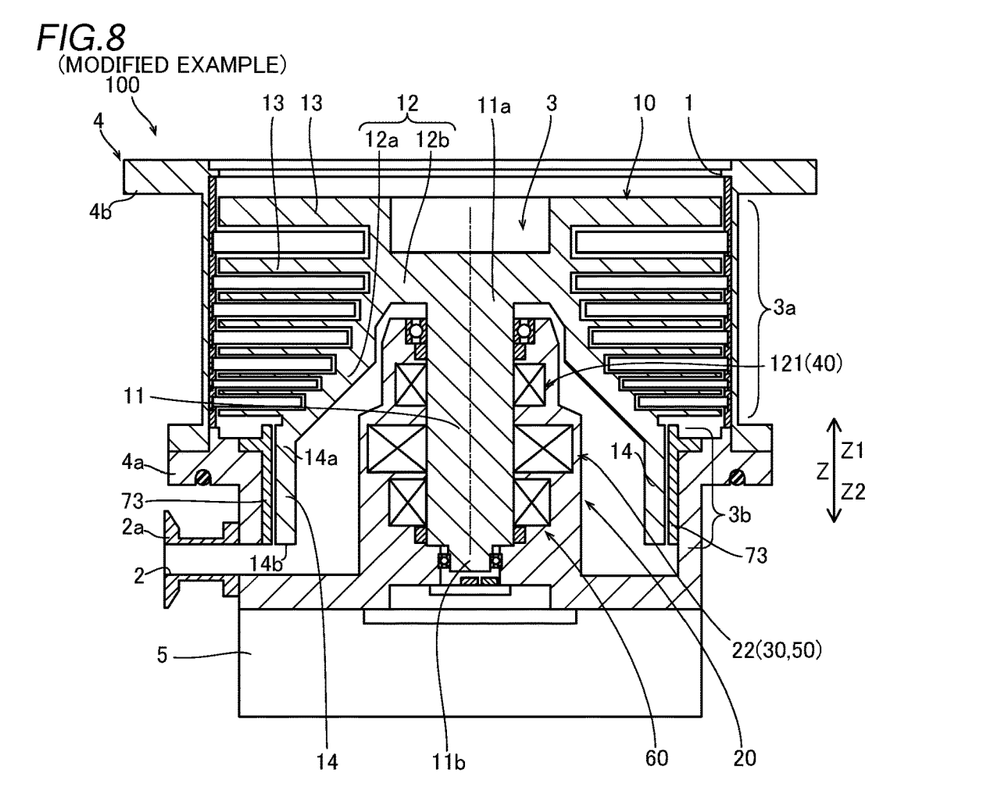
FIG. 8 is a schematic sectional view showing a modified example of the vacuum pump.

A vacuum pump 100 according to the modified example shown in FIG. 8 includes a magnetic bearing unit 121 including a first radial magnetic bearing 40 instead of the magnetic bearing unit 21 (see FIG. 1). Unlike the configuration example of FIG. 1, the magnetic bearing unit 121 is provided without a thrust magnetic bearing 60. The vacuum pump 100 includes the thrust magnetic bearing 60 provided separately from the magnetic bearing unit 121. Therefore, the magnetic bearing unit 121, a motor unit 22, and the thrust magnetic bearing 60 are arranged side by side in the axial direction. The thrust magnetic bearing 60 is arranged on the second end 11b side in the axial direction with respect to the magnetic bearing unit 121 and the motor unit 22, but may be arranged between the magnetic bearing unit 121 and the motor unit 22.

A known radial magnetic bearing structure can be adopted for the magnetic bearing unit 121. In an example of FIG. 9, the first radial magnetic bearing 40 includes a first bearing core 143 including a plurality of teeth 143a, and a plurality of first coils 41 attached to the teeth 143a. A total of eight first coils 41 are provided in eight teeth 143a, respectively. Two adjacent first coils 41 of the eight first coils 41 are connected to each other in series by the same winding wire to form four groups. The first coils 41 of each group generates a magnetic flux 41a (see a solid line in FIG. 9) that passes through one tooth 143a, a gap, a first core 44 (rotary shaft 11), and the other tooth 143a by current supply. The strength of the magnetic flux 41a generated in the first coils 41 of each group is controlled such that the first radial magnetic bearing 40 applies a bearing force to the rotary shaft 11 in any direction in the radial direction.

Figure 9:
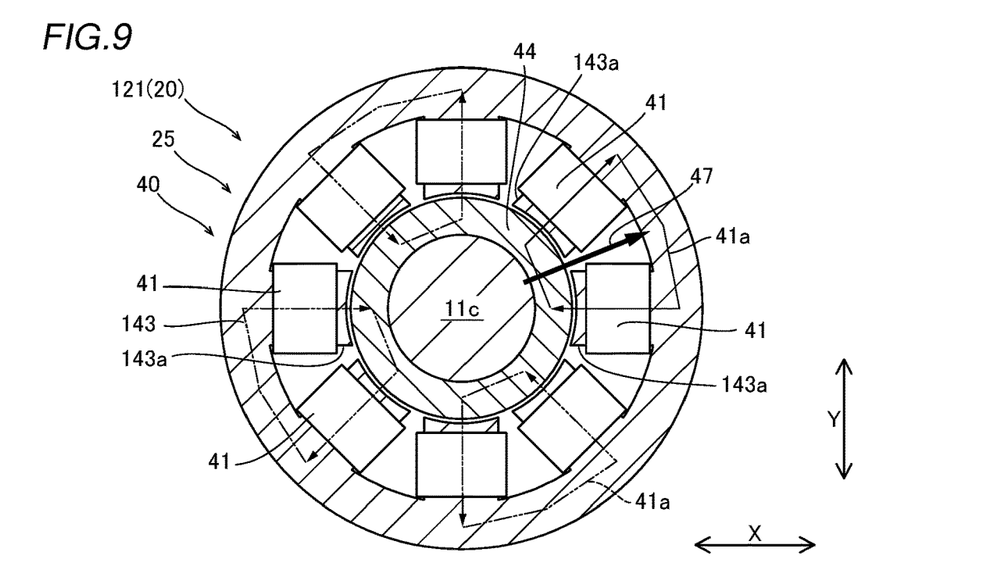
FIG. 9 is a schematic sectional view showing a magnetic bearing unit according to the modified example as viewed in the axial direction.
Figure 10:
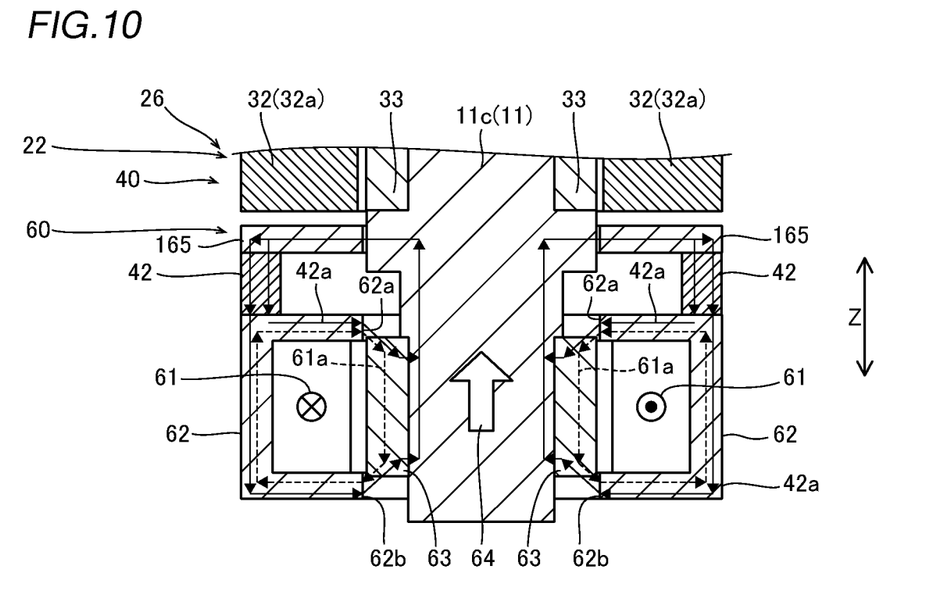
FIG. 10 is a schematic sectional view showing the magnetic bearing unit according to the modified example as viewed in the radial direction.

The configuration of the motor unit 22 according to the modified example shown in FIG. 9 is similar to that of the aforementioned embodiment (see FIG. 4), and thus the description thereof is omitted.

As shown in FIG. 10, the thrust magnetic bearing 60 includes a thrust coil 61, a thrust core 62 having a first end face 62a and a second end face 62b, a magnet 42, and a yoke 165. A bias magnetic flux 42a passes through the thrust core 62, a gap, a second core 63, a shaft 11c (rotary shaft 11), a gap, and the yoke 165 in this order from the north pole of the magnet 42 and returns to the south pole of the magnet 42. The thrust magnetic bearing 60 applies a bearing force 64 to the rotary shaft 11 in a direction in which a magnetic flux 61a of the thrust coil 61 and the bias magnetic flux 42a of the magnet 42 strengthen each other by interaction between the magnetic flux 61a of the thrust coil 61 and the bias magnetic flux 42a passing through each of the first end face 62a and the second end face 62b.

Thus, the vacuum pump 100 according to the modified example includes a rotation mechanism 20 including three units of the magnetic bearing unit 21, the motor unit 22, and the thrust magnetic bearing 60.

Other Modified Examples

While the example in which the motor unit 22 includes two types of coils, which are the motor coil 31 and the second coil 51, has been shown in the aforementioned embodiment, the present invention is not limited to this. The motor unit may include only one type of coil. That is, in FIG. 4, a single coil may be arranged instead of the motor coil 31 and the second coil 51 arranged in the same slot 32c (wound around the same tooth 32a). In this case, for example, the timing of current supply to each coil is time-divided, and at the first timing, a current to the coil is controlled so as to generate a torque for operating as the motor 30. At the second timing, a current to the coil is controlled so as to generate the bearing force 55 as the second radial magnetic bearing 50. The first timing and the second timing are alternately provided and switched such that the motor unit is operable as both the motor 30 and the second radial magnetic bearing 50 with one type of coil. In addition, a supply current to the motor unit may be controlled by a dq-axis control, the bearing force 55 of the second radial magnetic bearing 50 may be generated by a d-axis component of a current supplied to the coil, and the torque of the motor 30 may be generated by a q-axis component.

While the example in which the thrust magnetic bearing 60 is provided has been shown in the aforementioned embodiment, the present invention is not limited to this. In the present invention, instead of the thrust magnetic bearing 60, a thrust bearing other than the magnetic bearing may be provided. The thrust bearing may be a mechanical bearing or a fluid bearing, for example. The thrust magnetic bearing 60 may be a thrust magnetic bearing in which a pair of coils are arranged on both sides of a thrust disk in the axial direction.

While the example in which the center 25a of the first coil 41 of the magnetic bearing unit 21 is arranged closer to the center of gravity 16 of the rotary body 10 than the center 26a of the second coil 51 of the motor unit 22 has been shown in the aforementioned embodiment, the present invention is not limited to this. In the present invention, the center 26a of the second coil 51 of the motor unit 22 may be arranged closer to the center of gravity 16 of the rotary body 10 than the center 25a of the first coil 41 of the magnetic bearing unit 21. In this case, it is preferable that the center 26a of the second coil 51 of the motor unit 22 and the position of the center of gravity 16 of the rotary body 10 in the axial direction overlap each other. In this case, the second radial magnetic bearing 50 of the motor unit 22 is mainly used to support the rotary body 10 in the radial direction, and the magnetic bearing unit 21 only needs to generate a bearing force to prevent tilting of the rotary shaft 11. Therefore, the magnetic bearing unit 21 can be downsized and arranged closer to the first end 11a of the rotary shaft 11 accordingly.

While the example in which the forming range 97 of the magnetic bearing unit 21 in the axial direction and the position of the center of gravity 16 of the rotary body 10 in the axial direction overlap each other has been shown in the aforementioned embodiment, the present invention is not limited to this. The center of gravity 16 of the rotary body 10 may be arranged on the first end 11a side or the second end 11b side relative to the forming range 97 of the magnetic bearing unit 21 in the axial direction.

While the example in which the tapered portion 12a is provided in the blade support 12 has been shown in the aforementioned embodiment, the present invention is not limited to this. The inner diameter of the blade support 12 may gradually increase from the first end 11a side to the second end 11b side, for example. In this case, the tapered portion 12a is not formed in the blade support 12, and thus the magnetic bearing unit 21 does not need to be arranged between the rotary shaft 11 and the tapered portion 12a.

While the example in which the magnetic bearing unit 21 is arranged on the Z1 direction side relative to the end of the tapered portion 12a on the Z2 direction side in the axial direction of the rotary shaft 11 has been shown in the aforementioned embodiment, the present invention is not limited to this. At least a portion of the magnetic bearing unit 21 may be arranged on the Z2 direction side relative to the end of the tapered portion 12a on the Z2 direction side.

While the example in which the vacuum pump 100 is a composite vacuum pump including the first pump structure 3a and the second pump structure 3b has been shown in the aforementioned embodiment, the present invention is not limited to this. In the present invention, the second pump structure 3b may not be provided. That is, the vacuum pump may be a non-composite turbomolecular pump. In that case, the cylindrical portion 14 and the pump stator 73 forming the second pump structure 3b may not be provided in the vacuum pump 100.

While the example in which in the axial direction, the motor unit 22 is arranged on the first cylindrical end 14a side relative to the second cylindrical end 14b of the cylindrical portion 14 has been shown in the aforementioned embodiment, the present invention is not limited to this. The motor unit 22 may protrude toward the second end 11b side (Z2 direction side) from the second cylindrical end 14b of the cylindrical portion 14.

The structures of the first radial magnetic bearing 40 (see FIG. 6) and the second radial magnetic bearing 50 (see FIG. 4) shown in the aforementioned embodiment are merely examples and are not particularly limited. The number of coils, the arrangement of the coils, the number of slots, the arrangement of the slots (the arrangement of the teeth), the shapes of the cores, etc. of these radial magnetic bearings are arbitrary and can be changed.

Aspects

It will be appreciated by those skilled in the art that the exemplary embodiments described above are specific examples of the following aspects.

(Item 1)
A vacuum pump comprising:
a rotary body including a rotary shaft, the rotary shaft having a first end and a second end, the rotary shaft extending in an axial direction thereof, a blade support connected to the first end of the rotary shaft, the blade support having a shape extending such that an inner diameter thereof increases from the first end side toward the second end side in the axial direction of the rotary shaft, and a rotor blade provided on an outer peripheral surface of the blade support; and
a rotation mechanism including a motor configured to rotationally drive the rotary body, first and second radial magnetic bearings each configured to support the rotary body in a radial direction thereof, and a thrust bearing configured to support the rotary body in the axial direction; wherein
the rotation mechanism includes:
a magnetic bearing unit provided around the rotary shaft between the rotary shaft and the blade support, the magnetic bearing unit having a first outer diameter, the magnetic bearing unit being operable as the first radial magnetic bearing; and
a motor unit provided around the rotary shaft on the second end side of the rotary shaft relative to the magnetic bearing unit, the motor unit having a second outer diameter larger than the first outer diameter, the motor unit being operable as both the motor and the second radial magnetic bearing.

(Item 2)
The vacuum pump according to item 1, wherein
the magnetic bearing unit includes a first coil configured to form the first radial magnetic bearing; and
the motor unit includes, in a plane orthogonal to the axial direction of the rotary shaft, a motor coil configured to form the motor, a second coil configured to form the second radial magnetic bearing, and a stator core with the motor coil and the second coil wound therearound.

(Item 3)
The vacuum pump according to item 1 or 2, wherein
the thrust bearing includes a thrust magnetic bearing provided around the rotary shaft; and
the thrust magnetic bearing includes a magnet and a thrust coil, both of which are configured to generate magnetic fluxes that pass through the rotary shaft in the axial direction, respectively, and is configured to generate a bearing force in a thrust direction in the rotary shaft by interaction between the magnetic flux of the magnet and the magnetic flux of the thrust coil.

(Item 4)
The vacuum pump according to item 3, wherein the magnetic bearing unit is further operable as the thrust magnetic bearing.

(Item 5)
The vacuum pump according to item 4, wherein the magnetic bearing unit includes a first coil configured to form the first radial magnetic bearing, the thrust coil configured to form the thrust magnetic bearing, and the magnet configured to generate the magnetic flux that interacts with both the first radial magnetic bearing and the thrust magnetic bearing.

(Item 6)
The vacuum pump according to item 2, wherein
the rotary body has a center of gravity on the rotary shaft; and
the first coil of the magnetic bearing unit has a center located closer to the center of gravity of the rotary body than a center of the second coil of the motor unit in the axial direction of the rotary shaft.

(Item 7)
The vacuum pump according to item 6, wherein the magnetic bearing unit has an axial forming range that overlaps a position of the center of gravity of the rotary body in the axial direction.

(Item 8)
The vacuum pump according to any one of items 1 to 7, wherein
the blade support includes a tapered portion inclined from the second end side toward the first end side of the rotary shaft; and
the magnetic bearing unit is arranged between the rotary shaft and the tapered portion in a plane orthogonal to the axial direction of the rotary shaft.

(Item 9)
The vacuum pump according to item 8, wherein the magnetic bearing unit is arranged on the first end side relative to an end of the tapered portion on the second end side in the axial direction of the rotary shaft.

(Item 10)
The vacuum pump according to any one of items 1 to 9, further comprising:
a housing configured to house the rotary body and the rotation mechanism; wherein
the rotor blade is configured to form a first pump structure between the rotor blade and the housing;
the rotary body includes a cylindrical portion extending from the blade support toward the second end of the rotary shaft, the cylindrical portion being configured to form a second pump structure between the cylindrical portion and the housing; and
the motor unit includes at least a portion arranged in a housing space partitioned by an inner peripheral surface of the blade support and an inner peripheral surface of the cylindrical portion.

(Item 11)
The vacuum pump according to item 10, wherein
the cylindrical portion includes a first cylindrical end connected to the blade support and a second cylindrical end on a side opposite to the blade support in the axial direction of the rotary shaft; and
the motor unit is arranged on a side of the first cylindrical end relative to the second cylindrical end of the cylindrical portion in the axial direction.

Another Aspect

The embodiments described above can also be specific examples of the following aspect.

(Item 12)
A vacuum pump comprising:
a shaft extending along a central axis thereof;
a plurality of moving blades connected to the shaft, the plurality of moving blades being rotatable together with the shaft around the central axis of the shaft;
a plurality of stationary blades arranged alternately with the plurality of moving blades in an axial direction of the shaft;
a first radial magnetic bearing adjacent to a first axial position of the shaft in a radial direction of the shaft, the first radial magnetic bearing being configured to generate a magnetic force to adjust a radial position of the shaft at the first axial position;
a motor including a motor rotor fixed at a second axial position of the shaft, and a motor stator adjacent to the motor rotor in the radial direction, the motor stator being configured to rotate the motor rotor, the shaft, and the plurality of moving blades;

a second radial magnetic bearing adjacent to the second axial position of the shaft in the radial direction, the second radial magnetic bearing being configured to generate a magnetic force to adjust the radial position of the shaft at the second axial position; and a thrust magnetic bearing configured to generate a third magnetic force to generate a magnetic force to adjust an axial position of the shaft; wherein the first radial magnetic bearing has a first diameter;

the second radial magnetic bearing or the motor has a second diameter larger than the first diameter; and the first axial position is closer to the plurality of moving blades than the second axial position.

DESCRIPTION OF REFERENCE NUMERALS

3a: first pump structure
3b: second pump structure
4: housing
10: rotary body
11: rotary shaft
11a: first end
11b: second end
12: blade support
12a: tapered portion
13: rotor blade
14: cylindrical portion
14a: first cylindrical end
14b: second cylindrical end
15: housing space
16: center of gravity
20: rotation mechanism
21, 121: magnetic bearing unit
22: motor unit
25a: center of the first coil
26a: center of the second coil
30: motor
31: motor coil
32: stator core
40: first radial magnetic bearing
41: first coil
42: magnet
50: second radial magnetic bearing
51: second coil
60: thrust magnetic bearing
61: thrust coil
91: first outer diameter
92: second outer diameter
93, 94: inner diameter
100: vacuum pump

The invention claimed is:

1. A vacuum pump comprising:

a rotary body including a rotary shaft, the rotary shaft having a first end and a second end, the rotary shaft extending in an axial direction thereof, a blade support connected to the first end of the rotary shaft, the blade support having a shape extending such that an inner diameter thereof increases from the first end side toward the second end side in the axial direction of the rotary shaft, and a rotor blade provided on an outer peripheral surface of the blade support; and a rotation mechanism including a motor configured to rotationally drive the rotary body, first and second radial magnetic bearings each configured to support the rotary body in a radial direction of the rotary shaft, and a thrust bearing configured to support the rotary body in the axial direction; wherein the rotation mechanism includes:

a magnetic bearing unit provided around the rotary shaft between the rotary shaft and the blade support, the magnetic bearing unit having a first outer diameter, the magnetic bearing unit being operable as the first radial magnetic bearing; and a motor unit provided around the rotary shaft on the second end side of the rotary shaft relative to the magnetic bearing unit, the motor unit having a second outer diameter larger than the first outer diameter, the motor unit being operable as both the motor and the second radial magnetic bearing, wherein the thrust bearing includes a thrust magnetic bearing provided around the rotary shaft;

the thrust magnetic bearing includes a magnet and a thrust coil, both of which are configured to generate magnetic fluxes that pass through the rotary shaft in the axial direction, respectively, the magnetic bearing unit is further operable as the thrust magnetic bearing, and the magnetic bearing unit includes a first coil configured to form the first radial magnetic bearing, the thrust coil configured to form the thrust magnetic bearing, and a magnet configured to generate the magnetic flux that interacts with both a magnetic flux of the first coil and a magnetic flux of the thrust coil, and the magnet is provided in common with respect to the first coil and the thrust coil.

2. The vacuum pump according to claim 1, wherein the motor unit includes, in a plane orthogonal to the axial direction of the rotary shaft, a motor coil configured to form the motor, a second coil configured to form the second radial magnetic bearing, and a stator core with the motor coil and the second coil wound therearound.

3. The vacuum pump according to claim 2, wherein the rotary body has a center of gravity on the rotary shaft; and the first coil of the magnetic bearing unit has a center located closer to the center of gravity of the rotary body than a center of the second coil of the motor unit in the axial direction of the rotary shaft.

4. The vacuum pump according to claim 3, wherein the magnetic bearing unit has a range in the axial direction that overlaps a position of the center of gravity of the rotary body in the axial direction.

5. The vacuum pump according to claim 1, wherein the thrust magnetic bearing is configured to generate a bearing force in a thrust direction in the rotary shaft by interaction between the magnetic flux of the magnet and the magnetic flux of the thrust coil.

6. The vacuum pump according to claim 1, wherein the blade support includes a tapered portion inclined from the second end side toward the first end side of the rotary shaft; and the magnetic bearing unit is arranged between the rotary shaft and the tapered portion in a plane orthogonal to the axial direction of the rotary shaft.

7. The vacuum pump according to claim 6, wherein the magnetic bearing unit is arranged on the first end side relative to an end of the tapered portion on the second end side in the axial direction of the rotary shaft.

8. The vacuum pump according to claim 1, further comprising:
- a housing configured to house the rotary body and the rotation mechanism; wherein
- the rotor blade is configured to form a first pump structure between the rotor blade and the housing;
- the rotary body includes a cylindrical portion extending from the blade support toward the second end of the rotary shaft, the cylindrical portion being configured to form a second pump structure between the cylindrical portion and the housing; and
- the motor unit includes at least a portion arranged in a housing space partitioned by an inner peripheral surface of the blade support and an inner peripheral surface of the cylindrical portion.

9. The vacuum pump according to claim 8, wherein
- the cylindrical portion includes a first cylindrical end connected to the blade support and a second cylindrical end on a side opposite to the blade support in the axial direction of the rotary shaft; and
- the motor unit is arranged on a side of the first cylindrical end relative to the second cylindrical end of the cylindrical portion in the axial direction.

* * * * *